United States Patent [19]

Chadwick et al.

[11] Patent Number: 4,585,625

[45] Date of Patent: Apr. 29, 1986

[54] CATALYTIC THERMAL OXIDATION OF METHYL ISOCYANATE IN WASTE GASES

[75] Inventors: George F. Chadwick, Williamsville, N.Y.; Lawrence A. Kennedy, Worthington, Ohio

[73] Assignee: FMC Corporation, Philadelphia, Pa.

[21] Appl. No.: 772,290

[22] Filed: Sep. 4, 1985

[51] Int. Cl.⁴ ............................................. B01D 53/36
[52] U.S. Cl. .................................... 423/236; 423/245
[58] Field of Search ........................... 423/236, 245 S

[56] References Cited

U.S. PATENT DOCUMENTS 4,380,665  4/1983  Ager ..................................... 564/61

Primary Examiner—John Doll
Assistant Examiner—Lori S. Freeman
Attorney, Agent, or Firm—H. Robinson Ertelt; G. F. Mueller

[57] ABSTRACT

Methyl isocyanate in waste gaseous emissions is abated at temperatures substantially lower than those required in the conventional operation of a Process Thermal Oxidizer by contacting the waste gaseous emission with one or more transition metal oxide catalysts at a temperature of at least about 400° C.

15 Claims, No Drawings

CATALYTIC THERMAL OXIDATION OF METHYL ISOCYANATE IN WASTE GASES

This invention relates to a method for the control of methyl isocyanate contained in gaseous emissions from chemical processes.

One of the major commercial uses of methyl isocyanate in the chemical industry is in the carbamoylation reaction in the production of carbamate insecticides. In view of the toxic nature of methyl isocyanate in the exhaust gas from the reactor, it is essential that the exhaust gas undergo treatment so as to reduce the methyl isocyanate contained in the exhaust gas to an acceptably low level before discharging into the atmosphere. A common practice for the removal of methyl isocyanate involves passing the gaseous emission to an incinerator to burn the methyl isocyanate.

In the conventional incinerator known as a Process Thermal Oxidizer or PTO unit the methyl isocyanate and combustible components in the gaseous emission are burned. Although this treatment of the gas is effective, it is economically costly and inefficient. The PTO unit is fueled by fossil fuels and must be operated at temperatures of at least about 650° to 660° C. to reduce the methyl isocyanate to acceptable levels for discharge into the atmosphere. With the increasing costs of fossil fuels and the future availability and supplies of these fuels being uncertain, it is desirable to develop alternative and more economical and energy conservative methods for the treatment of waste gaseous emissions containing methyl isocyanate.

In accordance with the present invention, the gaseous waste stream containing methyl isocyanate is brought into contact with one or more transition metal oxides in a PTO unit at a temperature of at least 400° C. for a period of about 0.1 second or longer to oxidize, and thereby abate, the methyl isocyanate present. The presence of the transition metal oxide catalyst in the thermal oxidation process allows a substantial reduction in the threshold temperature for methyl isocyanate oxidation. Accordingly, the PTO unit may be operated effectively at appreciably lower temperatures thereby resulting in a substantial conservation of energy as compared to the conventional operation of the thermal oxidative process.

The efficacy and operability of the process were demonstrated by simulated conditions using representative catalysts and an air stream containing added methyl isocyanate. The catalysts selected for the tests were chromium (III) oxide/cobalt (II/III) oxide, chromium (III) oxide/manganese (IV) oxide, and chromium (III) oxide. The catalysts were deposited on three different supports; gamma alumina pellets, clay pellets and clay pellets washcoated with alumina. All pellets were about 3.2 mm in diameter. The clay pellets were formed by crushing conventional clay saddles, as commonly used in PTO units, and recovering pellets of the desired size. Clay pellets to be washcoated with alumina were added to a slurry consisting of

|  | Wt. % |
| --- | --- |
| Distilled water | 49.25 |
| Nitric acid (conc.) | 0.75 |
| Alumina trihydrate | 25.00 |
| Alumina monohydrate | 25.00 |

The mixture was stirred vigorously. The mass was then centrifuged and the recovered pellets dried in an oven at 200° C. for 3 hours.

The surface area of the substrates was determined by the Brunauer, Emmett, Teller (BET) method, ASTM Standard Method C819-77 (1982). The BET value of the gamma alumina pellets was 250 m$^2$/g; that of the washcoated clay pellets was 1.0 m$^2$/g; and that of the untreated clay pellets was 0.06 m$^2$/g. The gamma alumina pellets and the uncoated clay pellets were dried in an oven at 200° C. for 3 hours before determining the BET values.

The metal oxide or oxides were deposited on the support or carrier by impregnating the support with an aqueous solution of the metal nitrate followed by drying and calcining so as to decompose the nitrate and leave a deposit of the oxide. In the case of the mixtures of chromium oxide and cobalt oxide or manganese oxide, the ratio of chromium oxide to cobalt or manganese oxide may vary from about 1:1 to 5:1, by weight, preferably 2:1 to 4:1 and most preferably 3:1.

Supports for the metal oxide catalysts other than those set forth hereinbefore are satisfactory. The support structure should be a refractory material, must be stable and remain solid at the operating temperatures. The support should be such that the metal oxide catalyst will bond to it and have a sufficient surface area so as to hold from 0.5% to about 20%, by weight, of the catalyst. Examples of satisfactory refractory or ceramic support materials include ceramic saddles, Raschig rings, Lessig rings, spiral rings, etc. The catalyst loading of the support varies directly with the surface area of the support. Of the supports used in the illustrative examples, the alumina pellets are preferred because of the high surface area. A loading of about 0.9%, by weight, is obtainable for the clay support; about 2% for the washcoated clay support; and, about 12% for the gamma alumina support.

CATALYST PREPARATION FOR SIMULATED TESTS

Gamma alumina pellets (3.2 mm dia.) were dried in an air oven at 200° C. for 3 hours. Dry pellets (176 g) were impregnated with an aqueous solution containing 126.36 g of $Cr(NO_3)_3.9H_2O$ and 29.01 g of $Co(NO_3)_2.6H_2O$. The impregnated pellets were dried in a hot air stream at 152° C. for 15 minutes followed by calcining at 702° C. for 4 hours to decomposed the nitrates and leave a deposit of $Cr_2O_3$ and $CoO.Co_2O_3$ ($Co_3O_4$) in a weight ratio of approximately 3:1. The catalyst coated pellets weighed 200 g, thus containing 12%, by weight, of the catalyst.

In the same manner washcoated clay pellets were provided with 2%, by weight, deposits of $Cr_2O_3.Co_3O_4$, of $Cr_2O_3.MnO_2$, and of $Cr_2O_3$. In a similar manner uncoated clay pellets were provided with a 0.5%, by weight, deposit of $Cr_2O_3.Co_3O_4$.

In order to avoid any possible deactivation of the catalyst due to sintering during use, the supports carrying the catalysts were heated for 4 hours at 703° C. which is a temperature higher than the maximum expected operating temperature.

The experiments described in the examples which follow were conducted in a cylindrical reactor having a diameter of 19 mm and a length of 305 mm. The reactor was fabricated from type 304 stainless steel and constructed in a manner so as to permit the space volume of the catalyst, mounted within the reactor, to be varied.

The reactor was provided with gas sampling and temperature probes at both the inlet and the exit ports. Temperature probes were also positioned axially along the reactor. Platinum/platinum-10% rhodium thermocouples were used and were connected to either a digital readout and/or a strip chart recorder. Cooled, stainless steel probes were used for gas sampling. The gas samples were quenched and the level of MIC (methyl isocyanate) was measured with a Varian 3400 gas chromatograph fitted with a Porapak N column and operated in the ionization detector mode. The output was processed online with a Varian Model CDS 111 microprocessor. Accurate measurements of the concentration of MIC could be obtained to levels less than 1 ppm.

The reactor was insulated and mounted within an air oven constructed from angle iron and insulation board. A resistance heater was mounted within the oven so as to provide means for minimizing heat loss from the reactor and to allow the temperature in the reactor to be maintained constant within 1° C.

A Chromalox heater delivered gas heated to 426° C. to the reactor. The heated gas was passed through a thermal stabilizer to eliminate temperature fluctuations greater than 1° C. A three zone Lindberg furnace was interposed between the Chromalox heater and the reactor to provide means for increasing the temperature of the gas delivered to the reactor to 704° C.

The MIC used was either generated by an AID Corporation Model 330A calibration furnace which employed permeation tubes filled with MIC or was purchased as an air-MIC mixture containing 200 ppm MIC. In all examples, the gas was diluted with heated air to provide an air-MIC mixture containing 100 ppm MIC which was passed through the reactor. The concentration of MIC was monitored at both the inlet and outlet ports of the reactor.

In all examples the gaseous mixture was passed through the reactor at a pressure of 1 atmosphere.

EXAMPLE 1

The reactor was fully packed with alumina coated clay pellets carrying 2% of a selected catalyst. The reactor was heated to and maintained at 426° C. The air-MIC mixture was diluted with air heated to 426° C. to provide a gaseous mixture containing 100 ppm MIC. The heated gaseous mixture was passed through the reactor. The MIC content of the gaseous mixture was determined at both the inlet and outlet pots of the reactor by gas chromatography. The percentage of MIC destroyed for various residence periods was calculated from the analyses of the entry and exiting gas streams.

Run 1—The alumina coated clay pellets carried the catalyst $Cr_2O_3.Co_3O_4$, the ratio of $Cr_2O_3$ to $Co_3O_4$ being 3:1.

Run 2—The alumina coated clay pellets carried the catalyst $Cr_2O_3.MnO_2$, the ratio of $Cr_2O_3$ to $MnO_2$ being 3:1.

Run 3—The alumina coated clay pellets carried the catalyst $Cr_2O_3$.

The results are shown in Table I.

The foregoing example shows that of representative transition metal oxide catalysts the chromium oxide-cobalt oxide combination is most efficaceous in the low temperature destruction of MIC in gaseous mixtures.

EXAMPLE 2

As a control and to simulate the operation of the conventional PTO unit, the reactor was packed with uncoated clay pellets. The reactor was heated to and maintained at conventional temperatures. As in Example 1, a heated gaseous mixture containing 100 ppm MIC was passed through the reactor for a residence time of 2 seconds. The percentage of MIC destroyed was determined from the analyses of the MIC content at the outlet and inlet ports of the reactor.

Run 1—The reactor temperature was maintained at 593° C.

Run 2 —The reactor temperature was maintained at 649° C.

Run 3 —The reactor temperature was maintained at 704° C.

The results are reported in Table II.

EXAMPLE 3

The reactor was fully packed with gamma alumina pellets carrying 12% of the catalyst $Cr_2O_3.Co_3O_4$. The reactor was heated to and maintained at a desired temperature. The air-MIC mixture was diluted with air heated to the desired temperature to provie a gaseous mixture containing 100 ppm MIC and the mixture passed through the reactor. Analysis of the gaseous stream was determined at both the inlet and outlet ports of the reactor by gas chromotography. The percentage of MIC destroyed for various residence periods was calculated from the content of MIC at the outlet port at the resience periods.

Run 1—The temperature of the reactor and the gaseous mixture supplied to the reactor was 426° C.

Run 2—The temperature of the reactor and the gaseous mixture supplied to the reactor was 482° C.

Run 3—The temperature of the reactor and the gaseous mixture supplid to the reactor was 566° C.

Run 4—The temperature of the reactor and the gaseous mixture supplied to the reactor was 482° C. In this run methylene chloride was added to the air-MIC mixture to provide a feed mixture containing 100 ppm MIC and 50 ppm methylene chloride.

The results are reported in Table III.

EXAMPLE 4

The procedure of Example 3 was repeated after replacing the gamma alumina pellets with the alumina coated clay pellets carrying 2% of the catalyst $Cr_2O_3.Co_3O_4$.

Run 1—The temperature of the reactor and the gaseous mixture supplied to the reactor was 426° C.

Run 2—The temperature of the reactor and the gaseous mixture supplied to the reactor was 482° C.

Run 3—The temperature of the reactor and the gaseous mixture supplied to the reactor was 538° C.

The results are shown in Table IV.

EXAMPLE 5

After packing the reactor with uncoated clay pellets carrying 0.5% of the catalyst $Cr_2O_3.Co_3O_4$ the procedure of Example 3 was repeated.

Run 1—The temperature of the reactor and the gaseous mixture supplid to the reactor was 426° C.

Run 2—The temperature of the reactor and the gaseous mixture supplied to the reactor was 482° C.

Run 3 —The temperature of the reactor and the gaseous mixture supplied to the reactor was 538° C.

The results are reported in Table V.

The examples illustrate that the level of destruction of MIC attained by the practice of the present method cannot be obtained in the conventional PTO unit. Furthermore, the high levels of destruction of MIC are attained utilizing temperatures substantially lower than those used in PTO units.

It is obvious from the test results that the catalyst loading on the suppot varies directly with the surface area of the support. For any catalyst, the degree of destruction of MIC at a given temperature and residence time is expected to vary directly with the catalyst loading on the support. The data for $Cr_2O_3.Co_3O_4$ bear out this prediction. In the present investigations the maximum catalyst loading was on the alumina supports. It is of interest to note that with the alumina-catalyst combination the degree of destruction is not dependent upon temperature, providing of course, that the temperature exceeds 400° C. Using the gamma alumina support and the chromium oxide-cobalt oxide catalyst, a 99% destruction level is obtainable at a temperature of 460° C. and a residence time as brief as about 0.1 second. Hence, not only does this combination represent a considerably lower energy requirement but also permits a reduction in the size of the required oxidation unit.

For the lower catalyst loading on the supports, the destruction of MIC varies directly with the operating temperature and with the residence time. This is shown by the data in Tables IV and V. By extrapolation, washcoated clay-chromium oxide.cobalt oxide combinations may be used to reduce the MIC content of the gas to below 1 ppm by using residence times of about 1.5 seconds at a temperature of 538° C. to about 2.4 seconds at 426° C. Further extrapolation indicates that a residence time of about 10 seconds would be required when uncoated clay structures are used as the catalyst support.

It is obvious that the catalyst supports are, in fact, structures formed of refractory materials such as gamma alumina and clay. In the experimental unit, pellets of the refractory materials were utilized. In plant operations the structures would be saddles, Raschig rings, spiral rings, etc., such as conventionally used in PTO units. In commercial operation, the residence time for the waste stream would be dictated by the degree of destruction desired based upon the catalyst and the operating temperature.

TABLE I

Example 1
Catalyst support - Alumina coated clay pellets
Catalyst loading - 2%
Reactor temperature - 426° C.
Gaseous mixture - Air containing 100 ppm MIC

| Run | Catalyst | Residence Time (sec) | % MIC Destroyed |
|---|---|---|---|
| 1 | $Cr_2O_3.Co_3O_4$ | 0.4 | 55.0 |
|   |   | 0.6 | 69.0 |
|   |   | 1.1 | 86.0 |
|   |   | 1.35 | 93.9 |
|   |   | 1.4 | 93.5 |
|   |   | 2.1 | 98.0 |
| 2 | $Cr_2O_3.MnO_2$ | 0.6 | 50.0 |
|   |   | 1.1 | 72.0 |
|   |   | 1.5 | 84.0 |
|   |   | 2.05 | 92.5 |
| 3 | $Cr_2O_3$ | 0.4 | 29.0 |
|   |   | 1.0 | 63.0 |
|   |   | 1.6 | 81.0 |
|   |   | 1.95 | 87.0 |
|   |   | 2.0 | 84.0 |
|   |   | 2.3 | 92.5 |

TABLE II

Example 2
Reactor packing - Uncoated clay pellets
No catalysts
Gaseous mixture - Air containing 100 ppm MIC
Residence time - 2 seconds.

| Run | Reactor Temp. °C. | % MIC Destroyed |
|---|---|---|
| 1 | 593 | 83.0 |
| 2 | 649 | 87.0 |
| 3 | 704 | 89.0 |

TABLE III

Example 3
Reactor packing - Gamma alumina pellets carrying 12% $Cr_2O_3.Co_3O_4$
Gaseous mixture - Air containing 100 ppm MIC

| Run | Reactor Temp. °C. | Residence Time (sec) | % MIC Destroyed |
|---|---|---|---|
| 1 | 426 | 0.055 | 91.0 |
|   |   | 0.072 | 96.1 |
|   |   | 0.10 | 98.8 |
| 2 | 482 | 0.055 | 91.5 |
|   |   | 0.070 | 96.4 |
|   |   | 0.10 | 98.9 |
| 3 | 566 | 0.055 | 92.1 |
|   |   | 0.070 | 96.3 |
|   |   | 0.10 | 98.9 |
| 4 | 482* | 0.070 | 95.5 |
|   |   | 0.083 | 97.7 |

*50 ppm methylene chloride added to gaseous mixture.

TABLE IV

Example 4
Reactor packing - Alumina coated clay pellets carrying 2% $Cr_2O_3.Co_3O_4$
Gaseous mixture - Air containing 100 ppm MIC

| Run | Reactor Temp. °C. | Residence Time (sec) | % MIC Destroyed |
|---|---|---|---|
| 1 | 426 | 1.00 | 79.0 |
|   |   | 1.45 | 86.0 |
|   |   | 1.59 | 93.5 |
|   |   | 1.62 | 93.2 |
|   |   | 1.90 | 97.3 |
| 2 | 482 | 0.70 | 84.0 |
|   |   | 1.10 | 92.0 |
|   |   | 1.30 | 93.0 |
|   |   | 1.40 | 94.2 |
|   |   | 1.45 | 96.2 |
|   |   | 1.60 | 98.5 |
| 3 | 538 | 0.40 | 85.0 |
|   |   | 0.60 | 92.3 |
|   |   | 0.80 | 93.6 |
|   |   | 1.00 | 97.2 |
|   |   | 1.40 | 98.7 |

TABLE V

Example 5
Reactor packing - Uncoated clay pellets carrying 0.5% $Cr_2O_3.Co_3O_4$
Gaseous mixture - Air containing 100 ppm MIC

| Run | Reactor Temp. °C. | Residence Time (sec) | % MIC Destroyed |
|---|---|---|---|
| 1 | 426 | 1.00 | 45.0 |
|   |   | 1.75 | 69.0 |
|   |   | 2.10 | 75.0 |
| 2 | 482 | 1.00 | 55.0 |
|   |   | 1.55 | 70.0 |
|   |   | 2.00 | 83.0 |
| 3 | 538 | 1.00 | 60.0 |
|   |   | 1.50 | 71.0 |
|   |   | 1.70 | 81.0 |
|   |   | 2.00 | 86.0 |
|   |   | 2.40 | 90.5 |

What is claimed is:

1. The method for reducing the content of methyl isocyanate in gaseous waste streams which comprises subjecting the gaseous waste stream containing methyl isocyanate to thermal oxidation at a temperature between 400° C. and 566° C. in the presence of an effective amount of at least one transition metal oxide catalyst for a period sufficient to oxidize methyl isocyanate.

2. The method of claim 1 wherein the gaseous waste stream is maintained in contact with the catalyst for at least 0.1 second.

3. The method of claim 1 wherein the transition metal oxide catalyst is selected from the group chromium (III) oxide, cobalt (II/III) oxide and manganese (IV) oxide and mixtures thereof.

4. The method of claim 3 wherein the transition metal oxide catalyst is a mixture of chromium (III) oxide and cobalt (II/III) oxide or manganese (IV) oxide, the ratio, by weight, of the chromium (III) oxide to cobalt (II/III) oxide or manganese (IV) oxide being from 1:1 to 5:1.

5. The method of claim 4 wherein the ratio of chromium (III) oxide to cobalt (II/III) oxide or manganese (IV) oxide is 3:1.

6. The method of claim 3 wherein the temperature is between 426° and 566° C.

7. The method of claim 4 wherein the temperature is between 426° and 566° C.

8. The method of claim 5 wherein the temperature is between 426° and 566° C.

9. The method of claim 1 wherein the transition metal oxide catalyst is carried by a refractory support having a BET surface area of at least about 1.0 m$^2$/g.

10. The method of claim 9 wherein the refractory support is a gamma alumina structure.

11. The method of claim 9 wherein the refractory support is an alumina coated clay structure.

12. The method for reducing the content of methyl isocyanate in gaseous waste streams which comprises subjecting the gaseous waste stream containing methyl isocyanate to thermal oxidation at a temperature between 426° and 566° C. in the presence of an effective amount of a transition metal oxide catalyst selected from the group chromium (III) oxide.cobalt (II/III) oxide and chromium (III) oxide.manganese (IV) oxide carried by a refractory support structure having a BET surface area of at least about 1.0 m$^2$/g, the gaseous waste stream being maintained in the presence of the catalyst for at least 0.1 second.

13. The method of claim 12 wherein the weight ratio of the chromium (III) oxide to cobalt (II/III) oxide or manganese (IV) oxide is from 1:1 to 5:1.

14. The method of claim 13 wherein the weight ratio of the chromium (III) oxide to cobalt (II/III) oxide or manganese (IV) oxide is 3:1.

15. The method of claim 13 wherein the catalyst is chromium (III) oxide.cobalt (II/III) oxide, the weight ratio of chromium (III) oxide to cobalt (II/III) oxide being 3:1.

* * * * *